United States Patent
Papalini et al.

(10) Patent No.: US 11,438,431 B2
(45) Date of Patent: Sep. 6, 2022

(54) HYBRID INFORMATION-CENTRIC NETWORKING PROXY

(71) Applicant: Cisco Technology, Inc., San Jose, CA (US)

(72) Inventors: Michele Papalini, Issy les Moulineaux (FR); Jordan Augé, Saint-Cyr-l'ecole (FR); Giovanna Carofiglio, Paris (FR); Luca Muscariello, Paris (FR); Mauro Sardara, Issy-les-Moulineaux (FR); Xuan Zeng, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/996,673

(22) Filed: Aug. 18, 2020

(65) Prior Publication Data
US 2021/0120091 A1    Apr. 22, 2021

Related U.S. Application Data

(60) Provisional application No. 62/923,428, filed on Oct. 18, 2019.

(51) Int. Cl.
*H04L 67/565* (2022.01)
*H04L 67/01* (2022.01)
*H04L 69/16* (2022.01)
*H04L 67/2876* (2022.01)

(52) U.S. Cl.
CPC ...... *H04L 67/2823* (2013.01); *H04L 67/2876* (2013.01); *H04L 67/42* (2013.01); *H04L 69/162* (2013.01); *H04L 2212/00* (2013.01)

(58) Field of Classification Search
CPC . H04L 67/2823; H04L 67/2876; H04L 67/42; H04L 69/162
See application file for complete search history.

(56) References Cited

U.S. PATENT DOCUMENTS

| | | | |
|---|---|---|---|
| 10,122,632 B2 | 11/2018 | Trossen et al. | |
| 10,148,721 B2 | 12/2018 | Westphal et al. | |
| 2017/0373975 A1* | 12/2017 | Moiseenko | H04L 61/1511 |
| 2018/0103128 A1* | 4/2018 | Muscariello | H04L 67/327 |
| 2018/0227390 A1 | 8/2018 | Reznik et al. | |
| 2018/0241669 A1* | 8/2018 | Muscariello | H04L 9/3239 |

(Continued)

OTHER PUBLICATIONS

Conti et al., "The Road Ahead for Networking: A Survey on ICN-IP Coexistence Solutions," arxiv.org, Oct. 15, 2019, 27 papges.

*Primary Examiner* — Jeong S Park
(74) *Attorney, Agent, or Firm* — Patterson + Sheridan, LLP (57) ABSTRACT

Techniques for providing Hybrid information-centric networking (hICN) via a proxy application is described. A hICN proxy application provides hICN to legacy applications by diverting network traffic of a plurality of network traffic types to the hICN proxy application and storing network traffic information for the network traffic in a connection table. The hICN proxy application also translates the diverted network traffic to a hICN network traffic protocol and selects a forwarding strategy for the translated network traffic in order to send the hICN traffic over various non-hICN network protocol types. The hICN proxy application also transmits the translated traffic to a server proxy application using the selected forwarding strategy.

20 Claims, 7 Drawing Sheets

(56) References Cited

U.S. PATENT DOCUMENTS

| | | | |
|---|---|---|---|
| 2018/0241679 A1* | 8/2018 | Muscariello | H04L 43/0864 |
| 2018/0242186 A1* | 8/2018 | Muscariello | H04L 67/2842 |
| 2020/0305042 A1* | 9/2020 | Alam | H04W 28/14 |
| 2021/0120091 A1* | 4/2021 | Papalini | H04L 67/42 |

* cited by examiner

HYBRID INFORMATION-CENTRIC NETWORKING PROXY

TECHNICAL FIELD

Embodiments presented in this disclosure generally relate to heterogeneous access networks and devices with multiple and various types of access radios. More specifically, embodiments disclosed herein relate to enabling hybrid information-centric networking (hICN) capabilities for standard applications (e.g., non-hICN applications) via hICN proxies to allow the standard applications to utilize the multiple access radios and improve quality of experience for standard application users through reduced bandwidth consumption via reliable transport and small caches for local recovery, among other benefits.

BACKGROUND

Hybrid information-centric networking (hICN) is a developing network technology that provides for mobility and usage of heterogeneous access networks in addition to other benefits that improve network traffic handling. These capabilities are an important feature for fifth generation (5G) networks and to allow mobile devices to exploit multiple radios in the mobile devices in parallel. However, enabling hICN in existing or legacy applications on network devices is complicated and often results in changes to the coding of the application (e.g., an application's socket code). While this change in coding is possible, it introduces large amounts of additional labor and development resource usage in order to adapt each application for hICN. Enabling hICN for existing applications or non-hICN applications remains a challenge for adoption and utilization of hICN.

Furthermore, previous attempts for utilization of multiple paths for application traffic at a client device include Multipath transmission control protocol (MP-TCP) and multipath QUIC (MP-QUIC). However, both MP-TCP and MP-QUIC require a single proxy instance on the server side of the communication system, which tracks/maintains the state of the connection over the protocol. Furthermore, MP-TCP is not adapted to real time applications limiting its use for various applications on mobile client devices (e.g., cannot be efficiently used for voice and/or video applications, among others).

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: diverting, at a proxy application on a client device, network traffic of a plurality of network traffic types to the proxy application, storing network traffic information for the network traffic in a connection table at the proxy application, and translating the diverted network traffic to a hybrid information-centric networking (hICN) network traffic protocol. The method also includes selecting a forwarding strategy for the translated network traffic, and transmitting the traffic to a server proxy application using the selected forwarding strategy. Other embodiments of this aspect include corresponding computer systems, apparatus, and computer programs recorded on one or more computer storage devices, each configured to perform the actions of the methods.

A system of one or more computers can also be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, at a proxy application on a server, hybrid information-centric networking (hICN) network traffic from a proxy application on a client device, translating the received hICN network traffic to a one of a plurality of network traffic types, storing traffic information for the translated network traffic, providing the translated network traffic to a server based application, receiving response traffic from the server based application, and translating the response to a hICN network traffic protocol based on the stored traffic information; and transmitting the translated traffic to a proxy application. Other embodiments of this aspect include corresponding computer systems, apparatus, and computer programs recorded on one or more computer storage devices, each configured to perform the actions of the methods.

Example Embodiments

Hybrid information-centric networking (hICN) is a developing network technology that natively allows for mobility and usage of heterogeneous access networks at client devices (e.g., mobile devices, etc.). For example, hICN client devices may utilize multiple different types of access networks (e.g., mobile access networks, Wi-Fi networks, etc.) to send and received network traffic for application executing on the hICN client device. As described above, the ability to use multiple networks and increase mobility for client devices are important features for 5G networks. For example, utilization of hICN at client devices allows for the client device to exploit multiple radios in parallel, increasing the efficiency of network traffic transmission. For example, network traffic intensive applications may utilize multiple radios to increase network traffic throughput and diversity instead of overwhelming one network connection at the client device.

However, enabling hICN capabilities in applications that are not specifically coded or designed to utilize hICN is difficult and often requires significant software development time and resources to effectively implement hICN in the applications. For example, socket coding for each element of the application must be reviewed and recoded by a software developer in order to implement hICN in a legacy application. This increased time and labor commitment for legacy applications results in many legacy applications failing to properly utilize hICN.

The embodiments described herein provide for a hICN proxy between applications executing on a client device and networking components and resources of the client device. The hICN proxy diverts or traps traffic from an application and translates the traffic into hICN traffic such that current applications can exploit the benefits of hICN with small configuration changes or no significant modifications to the application itself as described in relation to FIGS. 1-7.

Figure 1:
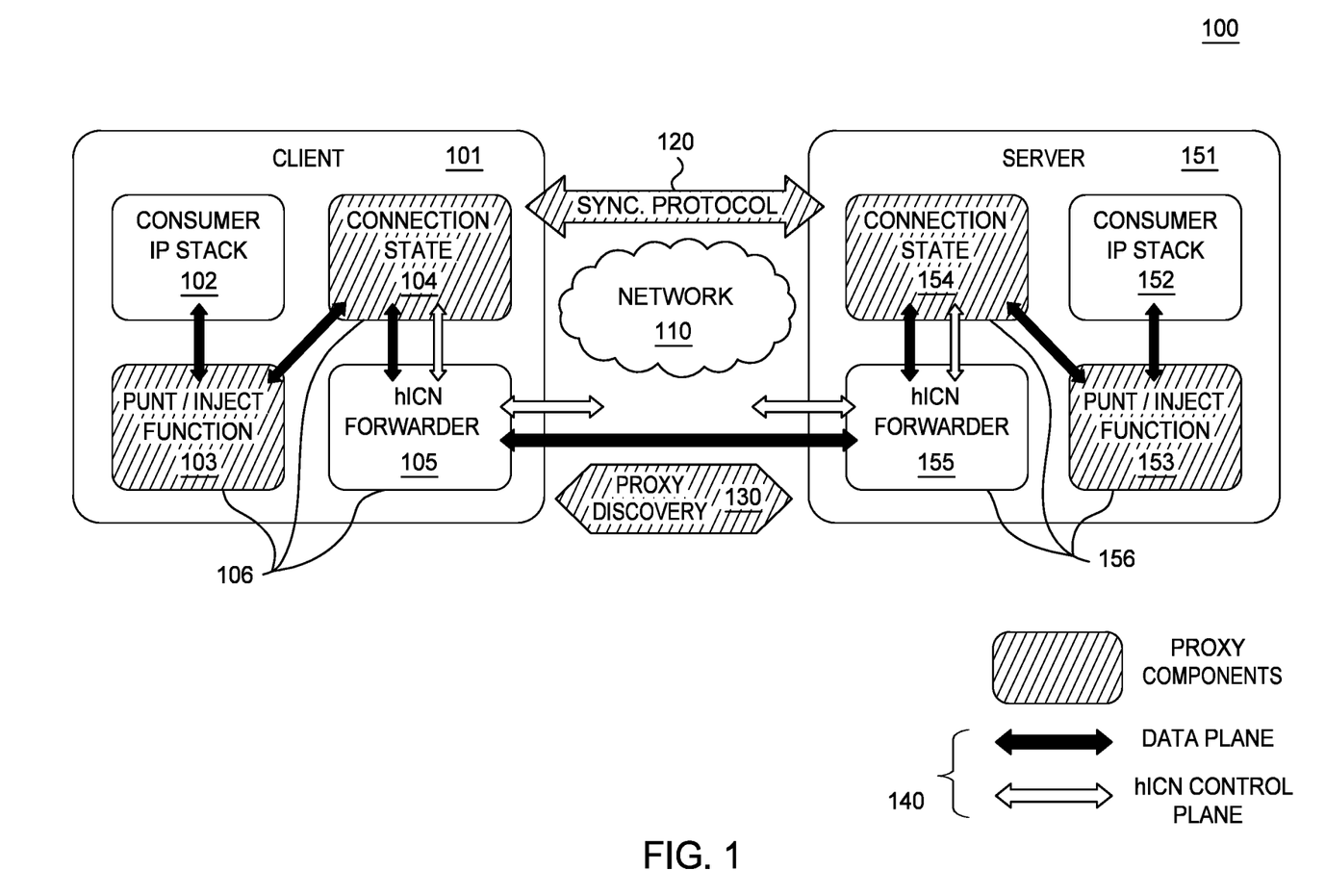
FIG. 1 illustrates a communication system, according to one embodiment.

FIG. 1 illustrates a communication system 100, according to one embodiment. The communication system 100 includes a client device 101 and a server 151. In some examples, the client device 101 and the server 151 are computing devices capable of communicating using internet protocol (IP) and/or hICN communication protocols via a network 110. The client device 101 includes a consumer IP stack which includes application traffic (e.g., network traffic generated by an application executing on the client device 101) and other network traffic destined for remote locations from the client device 101. The client device 101 also includes a hICN proxy application 106 including a punt/inject function 103, a connection state function 104, and an associated hICN forwarder function 105. The proxy discovery function 130 is also included in the communication system 100 and discussed in more detail in relation to FIG. 3. While shown as executing on the client device 101, the hICN proxy application 106 may also execute on a server or other computing device (e.g., deployed as a service in a cloud infrastructure, etc.).

The client device 101 communicates with the server 151 via the network 110. The server 151 includes a producer IP stack 152, which includes network traffic requested and/or or destined for the client device 101 (among other locations) and a hICN proxy application 156. The hICN proxy application 156 includes a punt/inject function 153, a connection state function 154, and an associated hICN function 155. In some examples, the producer IP stack includes application traffic generated at application instances executing on the server 151 (e.g., the server client for the application executing on the client device).

As described herein, the hICN proxy application 106 and hICN proxy application 156 enable hICN for standard applications network traffic without modifying the standard applications by trapping, intercepting, or otherwise diverting application traffic from the IP stacks, consumer IP stack 102 and producer IP stack 152 respectively.

The implementation of the hICN proxy applications 106 and 156 allows standard or legacy applications to use the multiple radios and access networks in the client device 101 according to the needs of the application. For example, a first application may use all the radio paths available at the client device to maximize a bandwidth for the traffic, while a second application may use the radio paths in a manner to minimize latency of the traffic.

The hICN proxy applications 106 and 156 also eliminate a need for a single proxy at a server side (e.g., at the server 151) of the communication system 100 for termination of all the connections from the client device. For example, for Wi-Fi/LTE multi-home mobile devices, the two wireless legs (the Wi-Fi and the LTE legs) may connect the client device to different proxy servers (e.g., via the server 151 and another server).

In this example, the use of the hICN proxy application 106 allows the client device 101 to retrieve part of the application traffic or content from one proxy server (e.g., the server 151) and part from another different proxy server. The hICN connection via the various proxy functions also provides seamless transport for encrypted flows such as transport layer security (TLS) (e.g., provides TLS flows for a single endpoint case).

Additionally, the use of the hICN proxy applications 106 and 156 present a number of advantages over MP-QUIC for implementing a generic proxy. For example, as described herein, hICN uses pull-based traffic transportations (i.e. data is triggered by per-packet user requests) and thus allows a better control of local radios on the client device, while also avoiding the need to communicate network status to a remote peer. This also allows hICN and the hICN proxy to react faster to changes in radio conditions on the client device since there is no need to establish subflows for the proxy and the hICN flows. Furthermore, dynamic forwarding decisions on the hICN flows allow for hICN routers on the hICN flows to provide assistance in forwarding the application traffic as described herein.

While shown as a single hICN proxy application on the server, the server 151 may include one or more hICN proxies to serve as terminuses for the hICN connections. Both of the hICN proxies, hICN proxy applications 106 and 156, are hICN enabled which includes the use of hICN sockets and the hICN protocol to exchange packets between the proxies. This allows for mobility and multipath communication between the client device 101 and the server 151.

In some examples, a defined or separate hICN network is not needed to support the hICN connection between the client device 101 and the server 151, since hICN packets may also be transported by standard IP networks. For example, the applications transmitting the network traffic are unaware of which kind of network the network traffic ultimately uses (e.g., IP or hICN) which allow for a mixed deployment of network communications between applications on the client device 101 and the server 151 (e.g., both IP and hICN communication). For example, network traffic for a video chatting application on the client device 101 may be transmitted using the hICN proxy application 106 while network traffic of a different client device running the video chatting application in communication with the client device 101 may be transmitted using a different network protocol.

In general the hICN proxies include the punt/inject functions 103 and 153 which intercept traffic from standard applications such as unmodified IP applications in order to transfer the network traffic over regular hICN connections. The specific implementation of the interceptions depends on the localization of the proxy application with respect to the application (e.g., a local proxy client vs a shared server proxy), and available APIs on the client device 101 and server 151. In some examples, the punt/inject functions 103 and 153 may intercept various traffic according to predetermined parameters and may not intercept other traffic, allowing the non-intercepted traffic to be routed using other protocols (e.g., IP protocols).

In some examples, the punt/inject function 103 is executed locally on the client device before the radio links. This positioning allows the hICN proxy application 106 to leverage all available radios for seamless mobility and/or bandwidth aggregation, wireless loss recovery, etc. based on the features of a hICN communication. In some examples, the punt/inject functions 103 and 153 may intercept various traffic according to predetermined parameters and may not intercept other traffic, allowing the non-intercepted traffic to be routed using other protocols (e.g., IP protocols).

The punt/inject function 103 may also utilize several methods to intercept or divert the traffic including using a SOCKs protocol to divert the traffic destined to a certain IP address to the hICN proxy application 106. This may include non-TCP flows which are supported from version 4 of the SOCKS protocol. The punt/inject function 103 may also use a VPN framework to divert all the network traffic coming from an application to a hICN proxy.

In some examples, the punt/inject function 103 may also use a Socket wrapper to hook wrap a regular socket API, and map each IP socket to a pair of hICN (producer and consumer) sockets, to manage both directions in the communication. This example allows the hICN proxy application 106 to avoid packet copies across the host kernel, as well as bypass lookups in the connection table.

The hICN proxy application 156 serves as the terminus of the hICN connection from the hICN proxy application 106. In some examples, the server-side proxy, hICN proxy application 156, is not co-located with the serving application (e.g., not on the same server device) and communicates with the serving application via the producer IP stack 152. The hICN proxy application 156 may also be shared by multiple connections from multiple users. Similarly, the server 151 serves both regular IP clients and enhanced-clients (e.g., client device 101) using a hICN proxy, without knowing that such traffic has once been transported over hICN. In order to preserve the hICN communication, response traffic from the server 151 flows in the reverse direction through both the hICN proxy application 156 and the hICN proxy application 106, to finally reach the application via the producer IP stack 152.

In some examples, the punt/inject function 153 marks or masks the various traffic that was received via the hICN connection when the traffic is provided to the producer IP stack 152 which causes the server 151 to reply back to the hICN proxy application 156 to ensure that the hICN connection is used for return traffic. In an example where the hICN names are allocated from a same IP prefix, or consists in the same IP address (e.g., demultiplexing on the port at the server 151), and when the proxy can be deployed on path, the punt/inject function 153 leverages the path symmetry intrinsic to IP routing (due to reverse path filtering) to ensure transparent punting on the server 151. This, in turn, preserves client IP addresses when the IP addresses are used for accounting purposes. Other protocols may also be used to take into account such IP address rewriting.

The connection state functions 104 and 154 implement a synchronization protocol 120 for the diverted traffic enabling push/pull translations of the network traffic. A hICN control plane 140 provides for proxy service discovery which complements a standard hICN control plane allowing name distribution between the hICN proxy applications 106 and 156. Once the network traffic is diverted inside the proxy the connection state functions 104 and 154 translate the diverted traffic into hICN traffic using packet encapsulation. This translation/encapsulation of the traffic does not break end-to-end connections and supports SSL connections. The encapsulation of the application traffic is also protocol agnostic and can be used for different kind of applications and application traffic.

In some examples, the connection state functions maintain a connection table for each IP flow from the application. The table maps the IP flow to one or more consumer/producer hICN sockets, each handling one specific direction (upstream & downstream). The hICN proxy application 106 leverages hICN control protocol in order to retrieve routable names it can use for transporting traffic over the Internet.

At this level all the features of hICN may be used by the hICN proxy application 106 and the hICN forwarder function 105. In some examples, applications may specify some requirements/parameters to the hICN proxy application 106 in order to select an appropriate forwarding strategy based on application requirements. For example a real-time application selects a forwarding strategy which minimizes traffic latency, while a video-streaming application may select a forwarding strategy which utilizes available paths (radios) in parallel in order to maximize the throughput.

In some examples, the connection state functions 104 and 154 use information in a proxy/connection field of the application traffic to further encode information, such as the type of traffic and the forwarding strategy that is expected on path. This information may be found in packet fields such as type of service (ToS) or Differentiated Services Code Point (DSCP). The information may also be determined by performing deep packet inspection on the application traffic (which is feasible locally where the number of flows in progress is limited), or simply through user cooperation. For example, connection state functions 104 and 154 may map the control, audio and video parts of a real time call to different name subprefixes, each using a different forwarding strategy both locally and on path in the hICN connection between the client device 101 and the server 151.

The connection state functions 104 and 154 also translate the usual push model from IP (e.g., TCP, QUIC, SCTP), into a hICN pull model. For example, the connection state functions 104 and 154 initiate a combination of connection/flow table and synchronization protocol, which ensures minimal perturbations to the traffic pattern (in terms of throughput, loss, jitter, etc.). For this the hICN proxy applications 106 and 156 leverage a combination of active and passive traffic detection on the other-side, prediction, and explicit notification.

Figure 2:
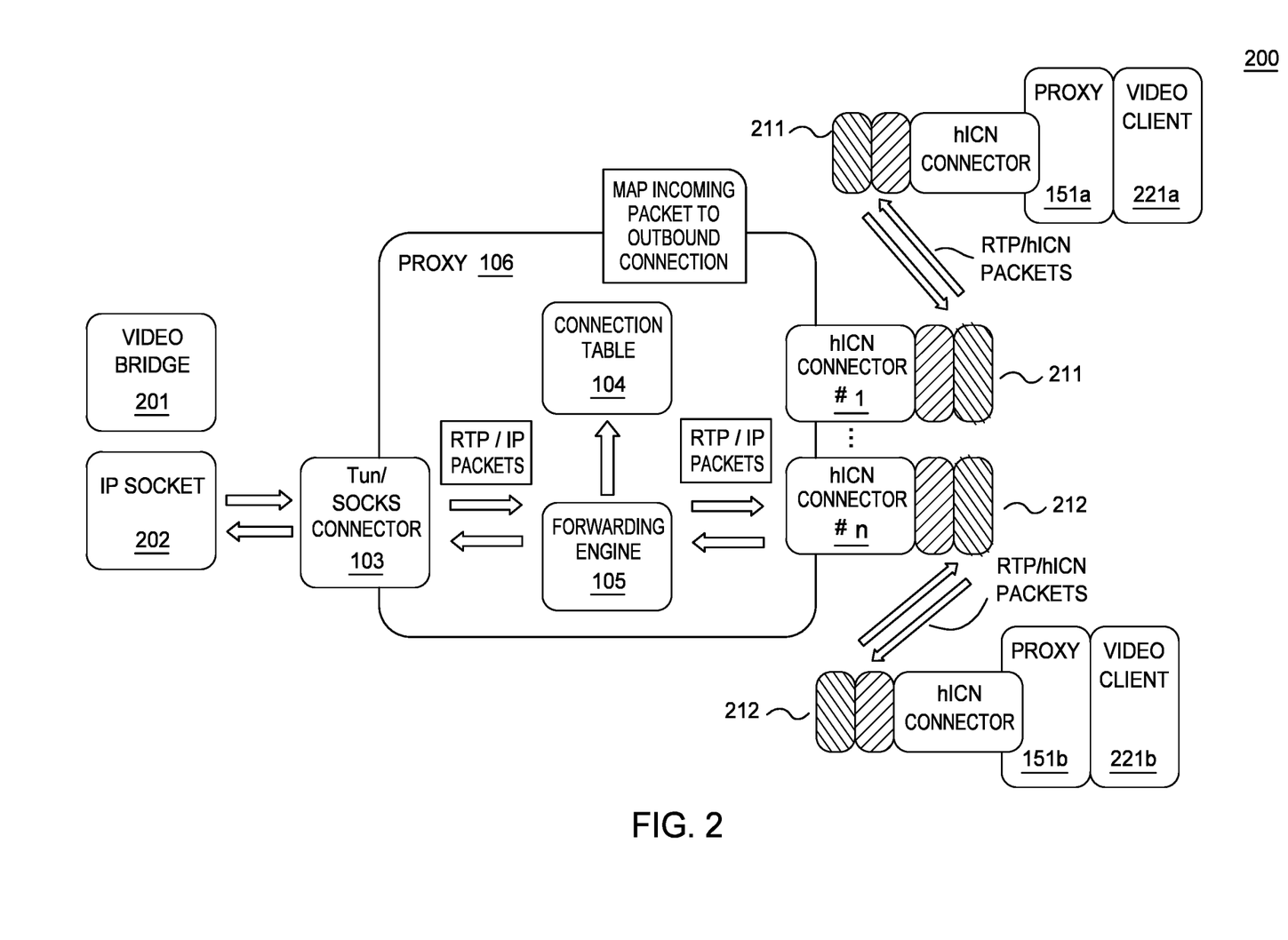
FIG. 2 illustrates a communication system for a video application, according to one embodiment.

An example application using the hICN proxy applications 106 and 156 is shown in FIG. 2, which illustrates a communication system 200 for a real time video application (e.g., video conferencing), according to one embodiment. The video bridge 201 and the IP socket 202 of a video application produce various network traffic. The punt injection function of the hICN proxy application 106 diverts the packets for the video application using the punt/inject functions 103 using one or more of the methods described in FIG. 1 such as SOCKS and/or virtual tunneling. The hICN forwarder function 105 interacts with the connection state function 104 (and the connection table maintained by the connection state function 104) to translate the traffic to hICN and to determine paths for the various network traffic translated into the hICN protocols.

The hICN forwarder function 105 then transmits the translated network traffic via one or more hICN connections 211-212. The hICN connections may be associated with different network connections and/or client device radios. The traffic is routed to the various server proxies, server proxies 151a-151b, and provided to the server side application of the video application executing on the client device such as the video client 221a-221b. The video client 221a-b also transmits response traffic which is transported back to the video application using a reverse path through the proxy 151a-151b and the hICN proxy application 106.

As shown in FIG. 2, the hICN proxy application 106 connects to multiple proxies such as the server proxies 151a-151b. The hICN proxies, hICN proxy applications 106 maintains state information for the connections at the client device (e.g., at the connection state function 104) which allows the hICN proxy application 106 to retrieve different parts of the content/network traffic from different proxy servers.

Figure 3:
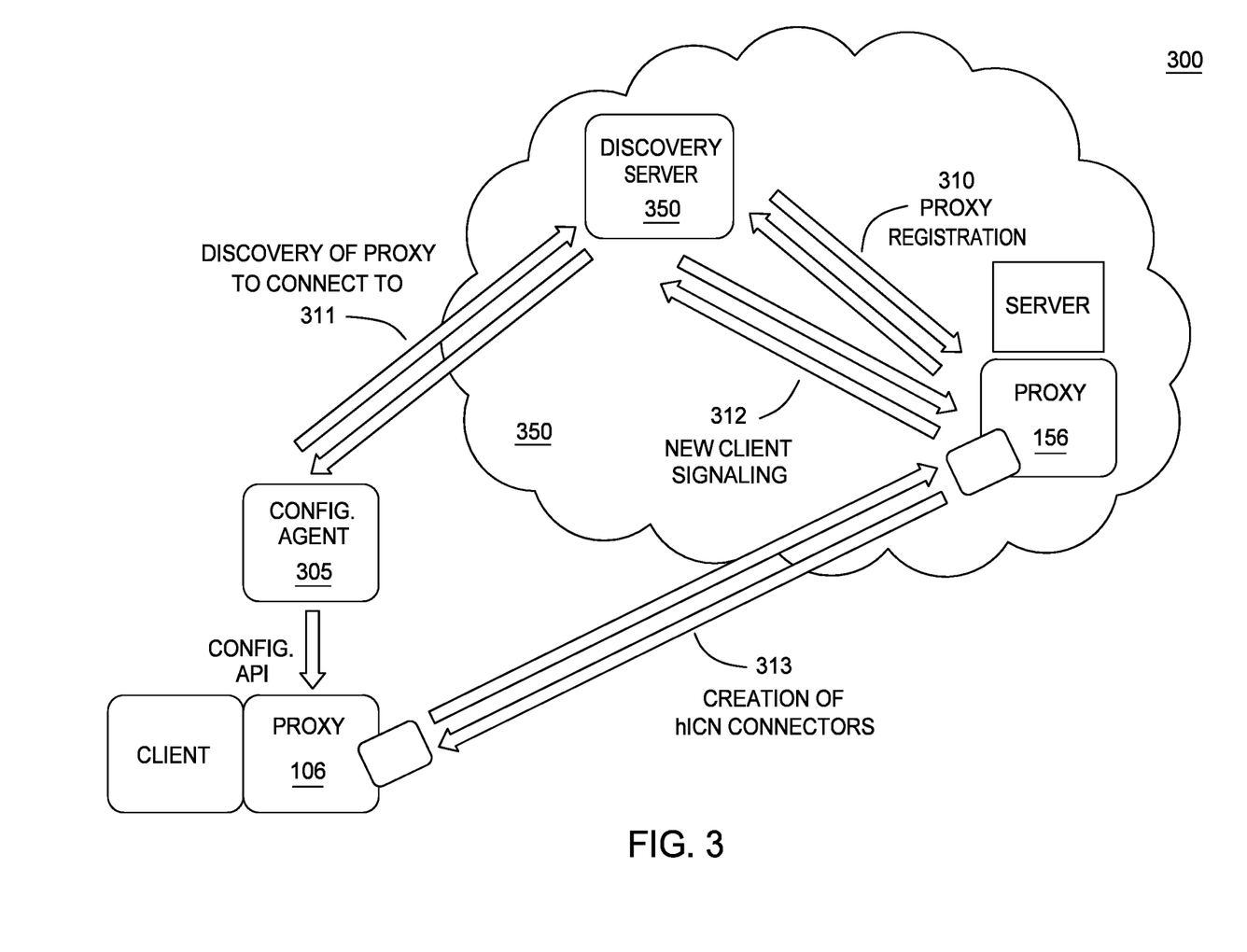
FIG. 3 illustrates a system flow diagram for proxy discovery, according to one embodiment.

FIG. 3 illustrates a system flow diagram for proxy discovery, according to one embodiment. For example, in the communication system 200, the hICN proxy application 106 on the client device should be connected to the hICN proxy application 156 on the server 151. A proxy discovery service and method establish the connection between proxies. In some examples, the discovery server 350 executes in a cloud network 300 that maintains information on every server proxy available to new client devices. When a new proxy application (e.g., the hICN proxy application 106) on the client device 101 starts or initiates, it requests a server proxy from the discovery server 350.

In some examples, the discovery server 350 determines available proxy servers at step 310 and replies to the proxy application 151 with a single proxy instance (e.g., connect to hICN proxy application 156) or with more than one (e.g., connect to proxy 151a-151b) via a configuration agent 305 at step 311. In some examples, there is no proxy that is reachable from all the radios available in on the client device (e.g., a hICN proxy application 156 may be reachable from the Wi-Fi network but not from the LTE one). In this case, the hICN proxy application 106 connects to multiple proxies.

The hICN proxy application 106, upon receiving configuration information at step 311 initiates communication with the assigned server proxies at step 313 to establish/create hICN connectors between the client device 101 and the server 151. In some examples, the hICN proxies, hICN proxy applications 106 and 156, keep all the state information for the connections at the client device (e.g., at the connection state function 104); the hICN proxy application 106 is then able to retrieve different parts of the content/network traffic from different proxy servers.

Figure 4:
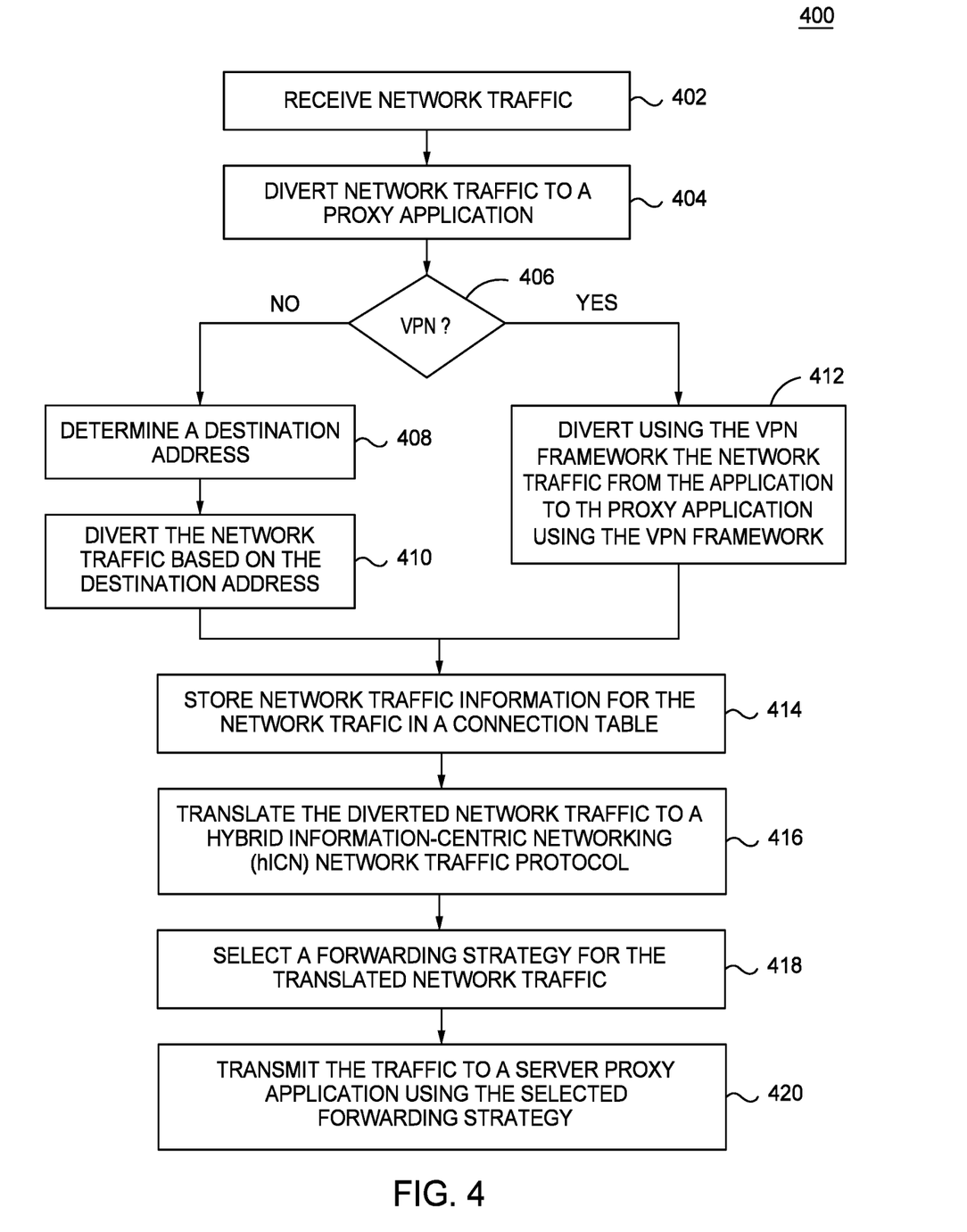
FIGS. 4-6 are flow charts outlining general operations to provide hybrid information-centric networking from a client device, according to embodiments described herein.

FIG. 4 is a flow chart outlining general operations to provide hybrid information-centric networking from a client device, according to embodiments described herein. For ease of discussion the methods described in FIGS. 4-7 will refer to the examples and systems as described in FIGS. 1-3. Method 400 begins at block 402 where a client device receives network traffic from an application such as a local application executing on the client device. For example, the consumer IP stack 102 in the client device 101 receives application traffic from an application executing on the client device 101. In some examples, the received network traffic includes traffic for a plurality of traffic types (e.g., IP traffic, TCP traffic, hICN traffic, etc.).

At block 404, the hICN proxy application 106 diverts network traffic of a plurality of network traffic types to the proxy application. For example, the hICN proxy application 106 diverts the network traffic to the hICN proxy application 106 using the punt/inject function 103. In some examples, diverting the network traffic includes the processes described in relation to blocks 406-412.

At block 406, the proxy application determines whether the application is associated with a virtual private network (VPN) framework. In an example where the application is associated with the VPN framework, method 400 proceeds to block 412 where the hICN proxy application 106 diverts, using the VPN framework, the network traffic from the application to the proxy application.

In an example where the application is not associated with a VPN frames the method 400 proceeds to block 408 where the hICN proxy application 106 determines a destination address for the network traffic and diverts the network traffic to the proxy application based on the determined destination address at block 410 using a SOCKs protocol.

At block 414, the hICN proxy application 106 stores network traffic information for the network traffic in a connection table at the proxy application. For example, the hICN proxy application 106 stores the network traffic information at the connection state function 104 as described in relation to FIG. 2.

At block 416, the hICN proxy application 106 translates the diverted network traffic to a hICN network traffic protocol. In some examples, such as when the connection between the hICN proxy application 106 and the server is via an IP network, the proxy application translates the network traffic as described in relation to FIG. 5.

Figure 5:
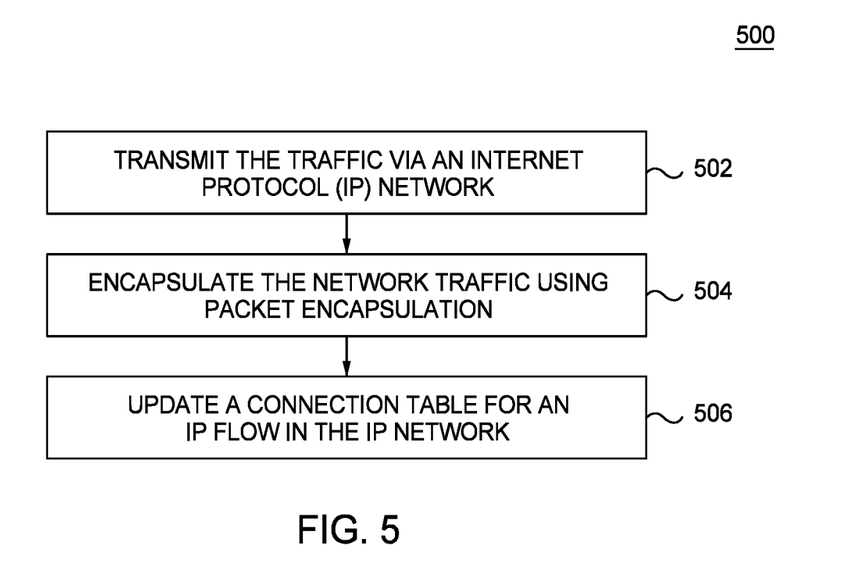

Method 500 begins at block 502, where the hICN proxy application 106 determines that the network (e.g., the network 110) is an IP network. At block 504, the hICN proxy application 106 encapsulates the network traffic using packet encapsulation and updates a connection table for an IP flow in the IP network at block 506. In some examples, the updated connection table maps the IP flow to a consumer and producer hICN socket.

Returning back to FIG. 4, at block 418, the hICN proxy application 106 selects a forwarding strategy for the translated network traffic. In some examples, standard features of hICN may be used by the hICN proxy application 106 and the hICN forwarder function 105. In some examples, applications may specify some requirements/parameters to the hICN proxy application 106 in order to select an appropriate forwarding strategy. For example a real-time application selects a forwarding strategy which minimizes traffic latency, while a video-streaming application may select a forwarding strategy which utilizes available paths (radios) in parallel in order to maximize the throughput.

At block 420, the proxy application transmits the traffic to a server proxy application (e.g., hICN proxy application 156) using the selected forwarding strategy. For example, the hICN proxy application 106 transmits the translated traffic to a server proxy application using the selected forwarding strategy.

Figure 6:
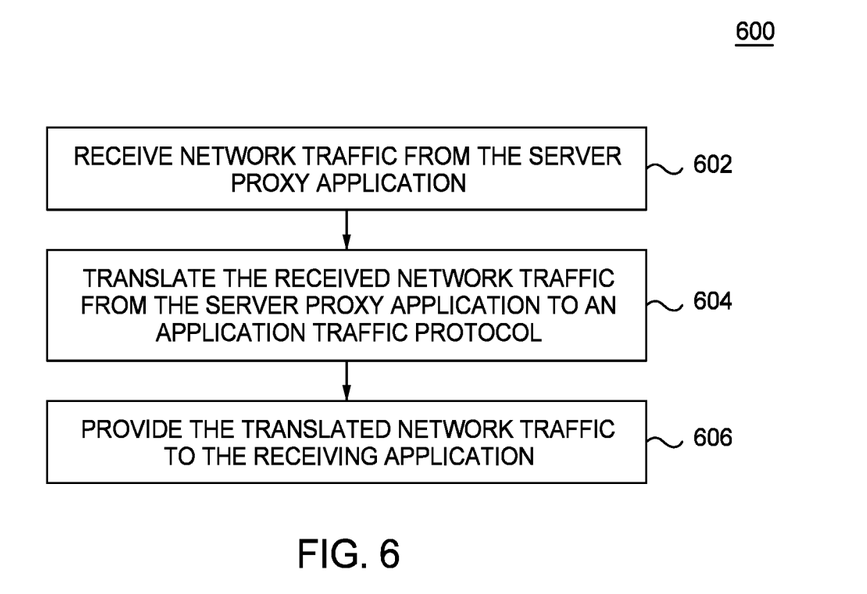

FIG. 6 is a flow chart outlining general operations to receive hICN traffic at a client device, according to embodiments described herein. Method 600 begins at block 602 where a client device receives network traffic from the server proxy application. For example, the client device 101 receives hICN traffic via the network 110 from the server 151. In some examples, the traffic is received from at least two server proxies (e.g., the proxy 151a and 151b as shown in FIG. 2.

At block 604, the client device 101 translates, using the stored network traffic information for the network traffic (e.g., the information in a connection table in the connection state function 104), the received network traffic from the server proxy application to an application traffic protocol for a receiving application.

At block 606, the client device 101 provides the translated network traffic to the receiving application. For example, as the hICN proxy application 106 translates the network traffic, the application traffic is provided to the application executing on the client device 101.

Figure 7:
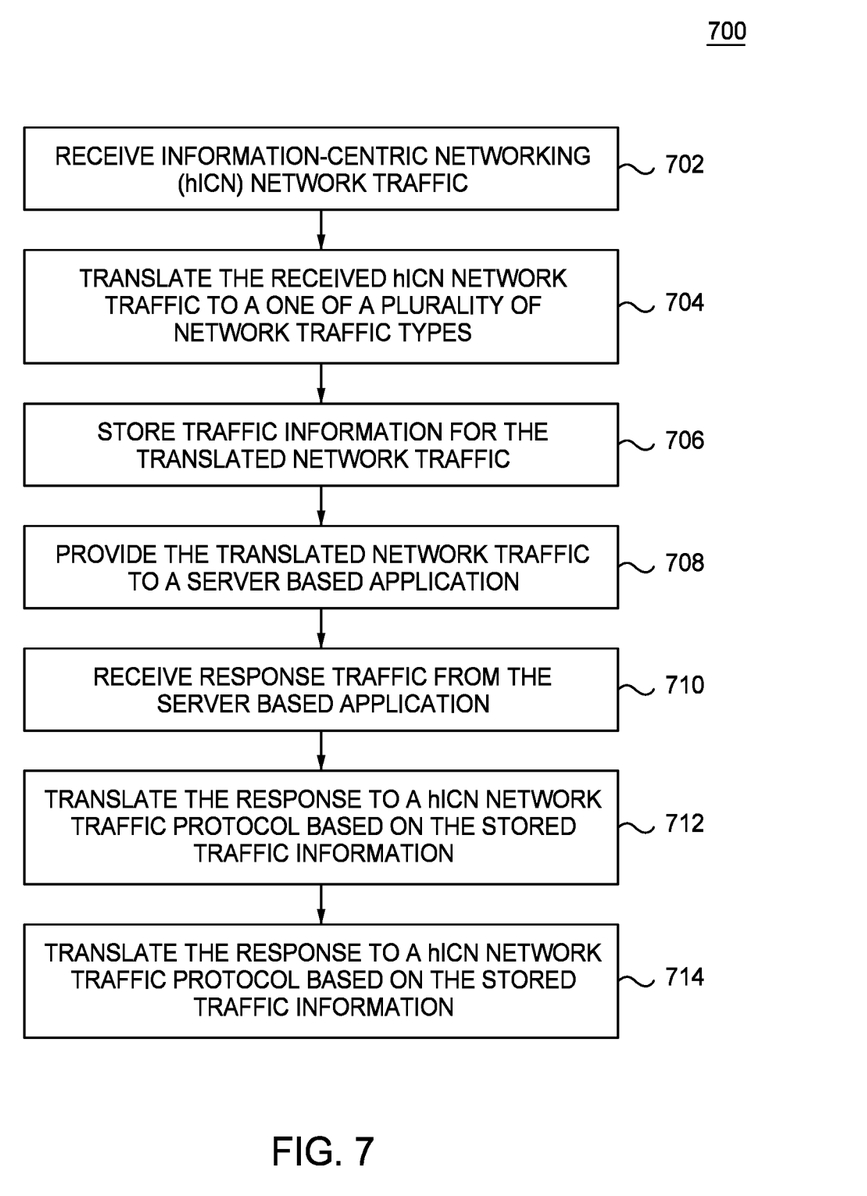
FIG. 7 is a flow chart outlining general operations to provide hybrid information-centric networking from a server, according to embodiments described herein.

FIG. 7 is a flow chart outlining general operations to provide hybrid information-centric networking from a server, according to embodiments described herein. Method 700 begins at block 702 where a proxy application on a server (e.g., hICN proxy application 156 on server 151) receives hybrid information-centric networking (hICN) network traffic from a proxy application on a client device (e.g., the hICN proxy application 106).

At block 704, the hICN proxy application 156 translates the received hICN network traffic to a one of a plurality of network traffic types. For example, the hICN proxy application 156 translates the received hICN traffic to an application specific protocol for a serving application in communication with the server 151.

At block 706, the hICN proxy application 156 stores traffic information for the translated network traffic. For example, the hICN proxy application 156 stores traffic information derived from the translated network traffic in the connection state function 154.

At block 708, the hICN proxy application 156 provides the translated network traffic to a server based application. For example, via the producer IP stack 152, the proxy application provides the network traffic to a serving application. In some examples, the serving application is executing on the server 151 or is in communication with the server via the producer IP stack. In some examples, the serving application may communicate with the hICN proxy application 106 via multiple proxies executing on differing servers.

Additionally, in some examples, the hICN proxy application 156 may also be shared by multiple connections from multiple users. Similarly, the server 151 serves both regular IP clients and enhanced-clients (e.g., client device 101) using a hICN proxy, without knowing that such traffic has once been transported over hICN. In order to preserve the hICN communication, response traffic from the server 151 flows in the reverse direction through both the hICN proxy application 156 and the hICN proxy application 106, to finally reach the application via the producer IP stack 152.

To facilitate this process in some examples, the punt/inject function 153 marks or masks the various traffic that was received via the hICN connection when the traffic is provided to the producer IP stack 152 which causes the server 151 to reply back to the hICN proxy application 156 to ensure that the hICN connection is used for return traffic. In turn, at block 710 the hICN proxy application 156 receives response traffic from the server based application. In an example where the hICN names are allocated from a same IP prefix, or consists in the same IP address (e.g., demultiplexing on the port at the server 151), and when the proxy can be deployed on path, the punt/inject function 153 leverages the path symmetry intrinsic to IP routing (due to reverse path filtering) to ensure transparent punting on the server 151. This, in turn, preserves client IP addresses when the IP addresses are used for accounting purposes. Other protocols may also be used to take into account such IP address rewriting.

At block 712 the hICN proxy application 156 translates the response to a hICN network traffic protocol based on the stored traffic information and transmits the translated traffic to a proxy application such as the hICN proxy application 106 at block 714.

The embodiments described herein provide hICN services to existing applications, and in particular allows the use multiple of radios or multiple paths to existing applications, even if they were designed to work in a unicast manner. The hICN proxies do not require a single proxy terminus at the server side. The use of hICN allows the proxy at the client device to retrieve content from multiple proxies at the server side, including proxies potentially localized in different locations. In the case of stateless connections (like video on demand), it is also possible to terminate the connections on multiple servers (in addition to multiple proxies)—which is useful for load balancing—or changing servers (and proxy)—for offloading purposes.

Figure 8:
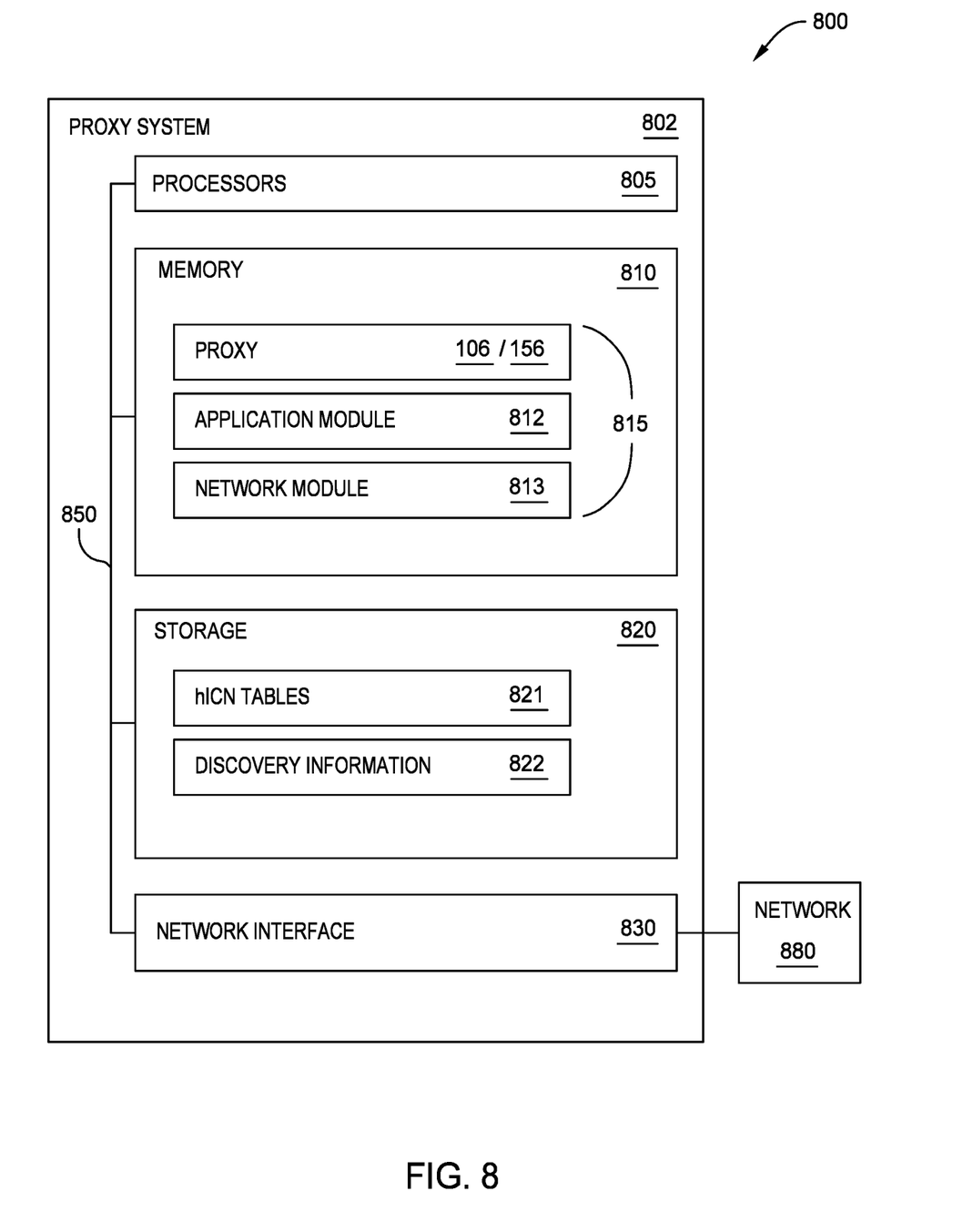
FIG. 8 illustrates a block diagram for a communication system, according to one embodiment.

FIG. 8 illustrates a block diagram for a proxy device 802 such as the client device 101 or the server 151, according to one embodiment. As shown in FIG. 6, the arrangement 800 includes the proxy device 802, which perform the methods described herein at least in relation to FIGS. 1-7. The proxy device 802 is shown in the form of a general-purpose computing device. The components of proxy device 802 may include, but are not limited to, one or more processing units or processors 805, a system memory 810, a storage system 820, network interface 830, and a bus 850 that couples various system components including the system memory 810 and storage system 820 to processors 805 along with the network interface 830. In some embodiments, the arrangement 800 is distributed and includes a plurality of discrete computing devices that are connected through wired or wireless networking.

The bus 850 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The proxy device 802 typically includes a variety of computer system readable media. Such media may be any available media that is accessible by proxy device 802, and it includes both volatile and non-volatile media, removable and non-removable media.

System memory 810 can include computer system readable media in the form of volatile memory, such as random access memory (RAM) and/or cache memory. Proxy device 802 may further include other removable/non-removable, volatile/non-volatile computer system storage media. In some examples, storage system 820 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 850 by one or more data media interfaces. As further depicted and described below, system memory 810 includes include at least one program product having a set (e.g., at least one) of program modules 815 that are configured to carry out the functions of embodiments of the peer switch described herein. The proxy device 802 may further include other removable/non-removable volatile/non-volatile computer system storage media. In some examples, storage system 820 may be included as part of system memory 810 and may typically provide a non-volatile memory for the networked computing devices, and may include one or more different storage elements such as Flash memory, a hard disk drive, a solid state drive, an optical storage device, and/or a magnetic storage device. Storage system 820 may include media for storing hICN tables 821 and discovery information 822. The information stored in storage system 820 may be updated and accessed by the program modules 815 described herein.

As described above, system memory 810 may include a plurality of program modules 815 for performing various functions related the function of the proxy device 802 such as proxy application 106/156, application module 812 and network module 813. The program modules 815 generally include program code that is executable by one or more of the processors 805.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
diverting, at a client device, network traffic from one or more applications on the client device, to a hybrid information-centric networking (hICN) proxy application, wherein the network traffic comprises of a plurality of network traffic types;
storing network traffic information for the network traffic in a connection table at the hICN proxy application;
translating the diverted network traffic to a hICN network traffic protocol;
selecting a forwarding strategy for the translated network traffic; and
transmitting the translated traffic to a server proxy application using the selected forwarding strategy.

2. The method of claim 1, wherein diverting network traffic of a plurality of network traffic types to the proxy application further comprises:
receiving the network traffic;
determining a destination address for the network traffic; and
diverting the network traffic to the proxy application based on the determined destination address.

3. The method of claim 1, wherein diverting network traffic of a plurality of network traffic types to the proxy application further comprises:
receiving the network traffic from a client application;
determining the client application is associated with a virtual private network (VPN) framework; and
diverting, using the VPN framework, the network traffic from the client application to the proxy application.

4. The method of claim 1, wherein transmitting the translated traffic to a server proxy application using the selected forwarding strategy comprises:
transmitting the translated traffic via an internet protocol (IP) network.

5. The method of claim 4, where translating the diverted network traffic to the hICN network traffic protocol comprises:
encapsulating the network traffic using packet encapsulation; and
updating a connection table for an IP flow in the IP network, wherein the connection table maps the IP flow to a consumer and producer hICN socket.

6. The method of claim 1, wherein selecting a forwarding strategy for the translated network traffic comprises:
selecting a forwarding strategy based on an application requirement for the network traffic.

7. The method of claim 1, further comprising:
receiving network traffic from the server proxy application;
translating, using the stored network traffic information for the network traffic, the received network traffic from the server proxy application to an application traffic protocol for a receiving application; and
providing the translated network traffic to the receiving application.

8. The method of claim 1, further comprising:
initiating the hICN proxy application;
transmitting a proxy connection request to a proxy server; and
receiving a proxy connection notification comprising one or more proxy connections.

9. A system for comprising:
one or more computer processors and a memory containing a program which when executed by the computer processors performs an operation comprising:
diverting, at a client device, network traffic, from one or more applications on the client device, to a hybrid information-centric networking (hICN) proxy application, wherein the network traffic comprises of a plurality of network traffic types;
storing network traffic information for the network traffic in a connection table at the hICN proxy application;
translating the diverted network traffic to a hICN network traffic protocol;
selecting a forwarding strategy for the translated network traffic; and
transmitting the translated traffic to a server proxy application using the selected forwarding strategy.

10. The system of claim 9, wherein diverting network traffic of a plurality of network traffic types to the hICN proxy application further comprises:
receiving the network traffic;
determining a destination address for the network traffic; and
diverting the network traffic to the hICN proxy application based on the determined destination address.

11. The system of claim 9, wherein diverting network traffic of a plurality of network traffic types to the hICN proxy application further comprises:
receiving the network traffic from a client application;
determining the client application is associated with a virtual private network (VPN) framework; and
diverting, using the VPN framework, the network traffic from the client application to the hICN proxy application.

12. The system of claim 9, wherein transmitting the translated traffic to a server proxy application using the selected forwarding strategy comprises:
transmitting the translated traffic via an internet protocol (IP) network.

13. The system of claim 12, where translating the diverted network traffic to the hICN network traffic protocol comprises:
encapsulating the network traffic using packet encapsulation; and
updating a connection table for an IP flow in the IP network, wherein the connection table maps the IP flow to a consumer and producer hICN socket.

14. The system of claim 9, wherein selecting a forwarding strategy for the translated network traffic comprises:
selecting a forwarding strategy based on an application requirement for the network traffic.

15. The system of claim 9, wherein the operation further comprises:
receiving network traffic from the server proxy application;
translating, using the stored network traffic information for the network traffic, the received network traffic from the server proxy application to a an application traffic protocol for a receiving application; and
providing the translated network traffic to the receiving application.

16. The system of claim 9, wherein the operation further comprises:
initiating the hICN proxy application;

transmitting a proxy connection request to a proxy server; and receiving a proxy connection notification comprising one or more proxy connections.

17. A method comprising:

receiving, at a proxy application on a server, hybrid information-centric networking (hICN) network traffic from a proxy application on a client device;

translating the received hICN network traffic to a one of a plurality of network traffic types;

storing traffic information for the translated network traffic;

providing the translated network traffic to a server based application; receiving response traffic from the server based application;

translating the response to a hICN network traffic protocol based on the stored traffic information; and transmitting the translated response to a proxy application.

18. The method of claim 17, further comprising:

receiving response traffic from the server based application;

translating the response to a hICN network traffic protocol based on the stored traffic information; and translating the response to a hICN network traffic protocol based on the stored traffic information.

19. The method of claim 17, wherein the hICN network traffic is received via an internet protocol (IP) network.

20. The method of claim 17 further comprising:

receiving a proxy connection request from an hICN proxy application on a client device;

establishing one or more proxy connections for the hICN proxy application; and providing a proxy connection notification comprising the one or more proxy connections to the hICN proxy application.

* * * * *

UNITED STATES PATENT AND TRADEMARK OFFICE
CERTIFICATE OF CORRECTION

PATENT NO. : 11,438,431 B2
APPLICATION NO. : 16/996673
DATED : September 6, 2022
INVENTOR(S) : Michele Papalini et al.

It is certified that error appears in the above-identified patent and that said Letters Patent is hereby corrected as shown below:

On the Title Page

Item (56), in Column 2, under "Other Publications", Line 2, delete "papges." and insert -- pages. --.

In the Drawings

On sheet 4 of 7, in Figure 4, reference numeral 414, Line 2, delete "TRAFIC" and insert -- TRAFFIC --.

In the Claims

In Column 14, Line 61, in Claim 15, delete "a an" and insert -- an --.

Signed and Sealed this
Third Day of January, 2023

Katherine Kelly Vidal
*Director of the United States Patent and Trademark Office*